(12) United States Patent
Nakamura (10) Patent No.: US 12,155,213 B2
(45) Date of Patent: Nov. 26, 2024

(54) ENERGY MANAGEMENT APPARATUS, ENERGY STORAGE APPARATUS, AND ENERGY MANAGEMENT METHOD

(71) Applicant: KYOCERA CORPORATION, Kyoto (JP)

(72) Inventor: Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 301 days.

(21) Appl. No.: 17/422,449

(22) PCT Filed: Jan. 24, 2020

(86) PCT No.: PCT/JP2020/002467
§ 371 (c)(1),
(2) Date: Jul. 13, 2021

(87) PCT Pub. No.: WO2020/158591
PCT Pub. Date: Aug. 6, 2020

(65) Prior Publication Data
US 2022/0094164 A1   Mar. 24, 2022

(30) Foreign Application Priority Data

Jan. 29, 2019   (JP) ................... 2019-013678

(51) Int. Cl.
*H02J 3/32* (2006.01)
*H02J 13/00* (2006.01)

(52) U.S. Cl.
CPC .......... *H02J 3/32* (2013.01); *H02J 13/00006* (2020.01); *H02J 2203/10* (2020.01)

(58) Field of Classification Search
CPC .. H02J 3/32; H02J 13/00006; H02J 13/00016; H02J 2203/10; H02J 7/0013; Y02E 60/00; Y04S 10/14
See application file for complete search history.

(56) References Cited

U.S. PATENT DOCUMENTS 10,840,709 B2   11/2020 Nakamura
11,056,911 B2    7/2021 Kakuda
(Continued)

FOREIGN PATENT DOCUMENTS

EP       3089309 A1    11/2016
JP    201728986 A      2/2017
(Continued)

OTHER PUBLICATIONS

Okamatsu et al., "Creation cooperation technology and energy management", Journal of the Society of Instrument and Control Engineers, vol. 57, No. 9, Sep. 2018, 10pp.
(Continued)

*Primary Examiner* — Jeffrey M Shin
(74) *Attorney, Agent, or Firm* — HAUPTMAN HAM, LLP (57) ABSTRACT

An EMS that manages an energy storage apparatus includes a communicator that notifies the energy storage apparatus of a discharge power setting value for setting power to be discharged by the energy storage apparatus. The communicator sets, as a part of the discharge power setting value, whether load following discharge is performed (whether there should be no reverse power flow).

6 Claims, 6 Drawing Sheets

(56) References Cited

U.S. PATENT DOCUMENTS

| | | | | |
|---|---|---|---|---|
| 2015/0293510 | A1* | 10/2015 | Satake | H01M 10/425 |
| | | | | 700/296 |
| 2016/0322826 | A1* | 11/2016 | Okino | H02J 13/00002 |
| 2016/0322846 | A1* | 11/2016 | Satake | H02J 7/02 |
| 2017/0297880 | A1 | 10/2017 | Kirk et al. | |

FOREIGN PATENT DOCUMENTS

| | | | |
|---|---|---|---|
| JP | 2017127031 A | 7/2017 | |
| WO | 2015098988 A1 | 7/2015 | |
| WO | 2017170464 A1 | 10/2017 | |
| WO | 2018003408 A1 | 1/2018 | |

OTHER PUBLICATIONS

"ECHONET Specification Appendix Detailed Requirements for ECHONET Device objects Release I", ECHONET Consortium, Dec. 9, 2016, 596 pages, Retrieved from the Internet <URL: https://www.echonet.jp/wp/wp-content/uploads/pdf/General/Standard/Release/Release_I_jp/Appendix_Release_I.pdf>, 596pp.

* cited by examiner

STORAGE BATTERY CLASS DEFINITION

CLASS GROUP CODE: 0×02
CLASS CODE: 0×7D
INSTANCE CODE: 0×01 TO 0×7F (0×00: FULL INSTANCE SPECIFICATION CODE)

| PROPERTY NAME | PROPERTY CONTENT | ACCESS RULE |
|---|---|---|
| | RANGE OF VALUES (DECIMAL NOTATION) | |
| DISCHARGE POWER SETTING VALUE | DISCHARGE POWER IS DEFINED BY W (AC). DEFINE WHETHER TO PERFORM LOAD FOLLOWING DISCHARGE | Set/ Get/ INF |
| | 0×00000000 TO 0×3B9AC9FF (0 TO 999,999,999 W), 0×FFFFFFFF: LOAD FOLLOWING DISCHARGE | |

STORAGE BATTERY CLASS DEFINITION

CLASS GROUP CODE: 0×02
CLASS CODE: 0×7D
INSTANCE CODE: 0×01 TO 0×7F (0×00: FULL INSTANCE SPECIFICATION CODE)

| PROPERTY NAME | PROPERTY CONTENT RANGE OF VALUES (DECIMAL NOTATION) | ACCESS RULE |
|---|---|---|
| OPERATION MODE SETTING | SET RAPID CHARGING/CHARGING/ DISCHARGING/STANDBY/TESTING/ AUTOMATIC OPERATION/OTHER OPERATION MODES OPERATION MODES OF CHARGING, DISCHARGING, AND STANDBY ARE REQUIRED. | Set/ Get |
| | RAPID STATE = 0×41, CHARGING = 0×42 DISCHARGING (WITHOUT REVERSE POWER FLOW) = 0×43 STANDBY = 0×44, TESTING = 0×45 AUTOMATIC OPERATION = 0×46, REACTIVATION = 0×48 EFFECTIVE CAPACITY RECALCULATION PROCESSING = 0×49 DISCHARGING (WITH REVERSE POWER FLOW) = 0×4B | |
| OPERATION OPERATING STATE | INDICATING OPERATING STATE OF STORAGE BATTERY. OPERATING STATES OF CHARGE STATE, DISCHARGE STATE, AND STANDBY STATE ARE REQUIRED | Get |
| | RAPID STATE = 0×41, CHARGING = 0×42 DISCHARGING (WITHOUT REVERSE POWER FLOW) = 0×43 STANDBY = 0×44, TESTING = 0×45 AUTOMATIC OPERATION = 0×46, REACTIVATION = 0×48 EFFECTIVE CAPACITY RECALCULATION PROCESSING = 0×49 DISCHARGING (WITH REVERSE POWER FLOW) = 0×4B | |

FIG. 7

STORAGE BATTERY CLASS DEFINITION

CLASS GROUP CODE: 0×02
CLASS CODE: 0×7D
INSTANCE CODE: 0×01 TO 0×7F (0×00: FULL INSTANCE SPECIFICATION CODE)

| PROPERTY NAME | PROPERTY CONTENT RANGE OF VALUES (DECIMAL NOTATION) | ACCESS RULE |
|---|---|---|
| OPERATION MODE SETTING | SET RAPID CHARGING/CHARGING/ DISCHARGING/STANDBY/TESTING/ AUTOMATIC OPERATION/OTHER OPERATION MODES. OPERATION MODES OF CHARGING, DISCHARGING, AND STANDBY ARE REQUIRED. | Set/ Get |
| | RAPID STATE = 0×41, CHARGING = 0×42 DISCHARGING = 0×43 STANDBY = 0×44, TESTING = 0×45 AUTOMATIC OPERATION = 0×46, REACTIVATION = 0×48 EFFECTIVE CAPACITY RECALCULATION PROCESSING = 0×49 OTHERS = 0×40 | |
| OPERATION OPERATING STATE | INDICATING TYPE OF GRID CONNECTION STATE | |
| | GRID CONNECTION (REVERSE POWER FLOW ENABLED) = 0×00 INDEPENDENT = 0×01 GRID CONNECTION (REVERSE POWER FLOW DISABLED) = 0×02 | Set/ Get/ INF |

FIG. 8

STORAGE BATTERY CLASS DEFINITION

CLASS GROUP CODE: 0×02
CLASS CODE: 0×7D
INSTANCE CODE: 0×01 TO 0×7F (0×00: FULL INSTANCE SPECIFICATION CODE)

| PROPERTY NAME | PROPERTY CONTENT RANGE OF VALUES (DECIMAL NOTATION) | ACCESS RULE |
|---|---|---|
| SPECIFIED DISCHARGE STATE | SET HOW TO DISCHARGE POWER FROM STORAGE BATTERY AND ACQUIRE DISCHARGE STATE | Set/ Get |
| | RATED MAXIMUM DISCHARGE: 0×41 LOAD FOLLOWING DISCHARGE: 0×42 | |

FIG. 9

ENERGY MANAGEMENT APPARATUS, ENERGY STORAGE APPARATUS, AND ENERGY MANAGEMENT METHOD

RELATED APPLICATIONS

The present application is a National Phase of International Application No. PCT/JP2020/002467, filed Jan. 24, 2020, which claims priority based on Japanese Patent Application No. 2019-013678, filed Jan. 29, 2019.

TECHNICAL FIELD

The present disclosure relates to an energy management apparatus, an energy storage apparatus, and an energy management method.

BACKGROUND ART

An energy management system (EMS) that is provided in a power consumer's facility and that controls a plurality of devices has attracted attention in recent years. For such an EMS, a communication protocol has been introduced for an energy management apparatus to control devices provided by various manufacturers.

One such communication protocol, ECHONET Lite (registered trademark), defines device classes for each type of device, and defines information and control targets of each device as properties for each device class.

For example, an energy storage apparatus belongs to a storage battery class, and the properties corresponding to the storage battery class include a discharge power setting value, an operation mode setting, and a grid connection state (for example, see Non-Patent Document 1).

CITATION LIST

Non-Patent Literature

Non-Patent Document 1: "ECHONET SPECIFICATION APPENDIX ECHONET Device Object Details Release I," Jan. 15, 2019, Internet <URL: https://www.echonet.jp/wp/wp-content/uploads/pdf/General/Standard/Release/Release_I_jp/Appendix_Release_I.pdf>

SUMMARY

An embodiment of the present disclosure has a first feature in that an energy management apparatus that manages an energy storage apparatus includes a communicator configured to issue a notification, to the energy storage apparatus, to set a discharge power setting value for setting power to be discharged by the energy storage apparatus, and when setting the energy storage apparatus to perform the load following discharge, the communicator issues a notification, to the energy storage apparatus, of a predetermined value indicating load following discharge as the discharge power setting value.

An embodiment of the present disclosure has a second feature in that an energy management apparatus that manages an energy storage apparatus includes a communicator configured to issue a notification, to the energy storage apparatus, to set an operation mode setting for setting an operation mode of the energy storage apparatus, and the communicator sets, as the operation mode in the operation mode setting, discharging with a reverse power flow from the energy storage apparatus to a grid and discharging without the reverse power flow as distinguished from each other.

An embodiment of the present disclosure has a third feature in that an energy management apparatus that manages an energy storage apparatus includes a communicator configured to issue a notification, to the energy storage apparatus, to set a grid connection state for setting a connection state between the energy storage apparatus and a grid and an operation mode setting for setting an operation mode of the energy storage apparatus, and the communicator sets, in the grid connection state, a grid connection with a reverse power flow from the energy storage apparatus to the grid and a grid connection without the reverse power flow as distinguished from each other, and sets, as the operation mode in the operation mode setting, discharging.

An embodiment of the present disclosure has a fourth feature in that an energy management apparatus that manages an energy storage apparatus includes a communicator configured to issue a notification, to the energy storage apparatus, to set a specified discharge state for setting one of performing rated maximum discharge, performing specified output discharge, and performing load following discharge.

An embodiment of the present disclosure has a fifth feature in that an energy storage apparatus controlled by an energy management apparatus includes a communicator configured to receive, from the energy management apparatus, a notification of a discharge power setting value for setting power to be discharged by the energy storage apparatus; and a controller configured to set load following discharge when the received discharge power setting value is a predetermined value indicating load following discharge.

An embodiment of the present disclosure has a sixth feature in that an energy storage apparatus controlled by an energy management apparatus includes a communicator configured to receive, from the energy management apparatus, a notification of an operation mode setting for setting an operation mode of the energy storage apparatus; and a controller configured to set the operation mode in accordance with the operation mode setting, and the operation mode setting enables, as the operation mode, setting of discharging with a reverse power flow from the energy storage apparatus to a grid and discharging without the reverse power flow as distinguished from each other.

An embodiment of the present disclosure has a seventh feature in that an energy storage apparatus controlled by an energy management apparatus includes a communicator configured to receive, from the energy management apparatus, a notification of a grid connection state for setting a connection state between the energy storage apparatus and a grid and an operation mode setting for setting an operation mode of the energy storage apparatus; and a controller configured to set the connection state in accordance with the grid connection state and set the operation mode in accordance with the operation mode setting, and the grid connection state enables setting of a grid connection with a reverse power flow from the energy storage apparatus to the grid and a grid connection without the reverse power flow as distinguished from each other, and the operation mode setting enables, as the operation mode, setting of discharging.

An embodiment of the present disclosure has an eighth feature in that an energy storage apparatus controlled by an energy management apparatus includes a communicator configured to receive a notification of a specified discharge state for setting one of performing rated maximum discharge, performing specified output discharge, and performing load following discharge from the energy management apparatus; and a controller configured to set the performing rated maximum discharge, the performing specified output discharge, or the performing load following discharge, in accordance with the specified discharge state.

An embodiment of the present disclosure has a ninth feature in that an energy management method for managing an energy storage apparatus includes issuing a notification, to the energy storage apparatus, to set a discharge power setting value for setting power to be discharged by the energy storage apparatus, and in the issuing, whether load following discharge is performed is set as a part of the discharge power setting value.

An embodiment of the present disclosure has a tenth feature in that an energy management method for managing an energy storage apparatus includes issuing a notification, to the energy storage apparatus, to set an operation mode setting for setting an operation mode, and in the issuing, as the operation mode in the operation mode setting, discharging with a reverse power flow from the energy storage apparatus to a grid and discharging without the reverse power flow are set as distinguished from each other.

An embodiment of the present disclosure has an eleventh feature in that an energy management method for managing an energy storage apparatus includes issuing a notification, to the energy storage apparatus, to set a grid connection state for setting a connection state between the energy storage apparatus and a grid and an operation mode setting for setting an operation mode of the energy storage apparatus, and in the issuing, in the grid connection state, a grid connection with a reverse power flow from the energy storage apparatus to the grid and a grid connection without the reverse power flow are set as distinguished from each other, and, as the operation mode in the operation mode setting, discharging is set.

An embodiment of the present disclosure has a twelfth feature in that an energy management method for managing an energy storage apparatus includes issuing a notification, to the energy storage apparatus, to set a specified discharge state for setting one of performing rated maximum discharge, performing specified output discharge, and performing load following discharge.

DESCRIPTION OF EMBODIMENTS

Under the current Feed-in Tariff (FIT), power generated by photovoltaic (PV) devices for residential use and stored in energy storage apparatuses is regulated so as not to be dischargeable to the power grid side.

Still, this regulation may be relaxed in the future to enable also the power generated by photovoltaic devices for residential use and stored in energy storage apparatuses to be discharged to the power grid side.

However, communication protocols such as ECHONET Lite are not built based on such a prospect. Thus, there is a problem in that these protocols cannot be set to cause the power stored in energy storage apparatuses to be discharged toward the power grid side.

For example, ECHONET Lite has a problem in that the storage battery class or the like is not provided with a property for discharging the stored power to the power grid side.

Thus, the present disclosure is made in view of the above problem, and provides a control system enabling power stored in an energy storage apparatus to be appropriately discharged to the power grid side, with a communication protocol between an energy management apparatus and an energy storage apparatus.

A control system according to an embodiment of the present invention will be described below with reference to the drawings. Note that in the drawings used for the following description, the same or similar components are denoted with the same or similar reference numerals.

First Embodiment

Figure 1:
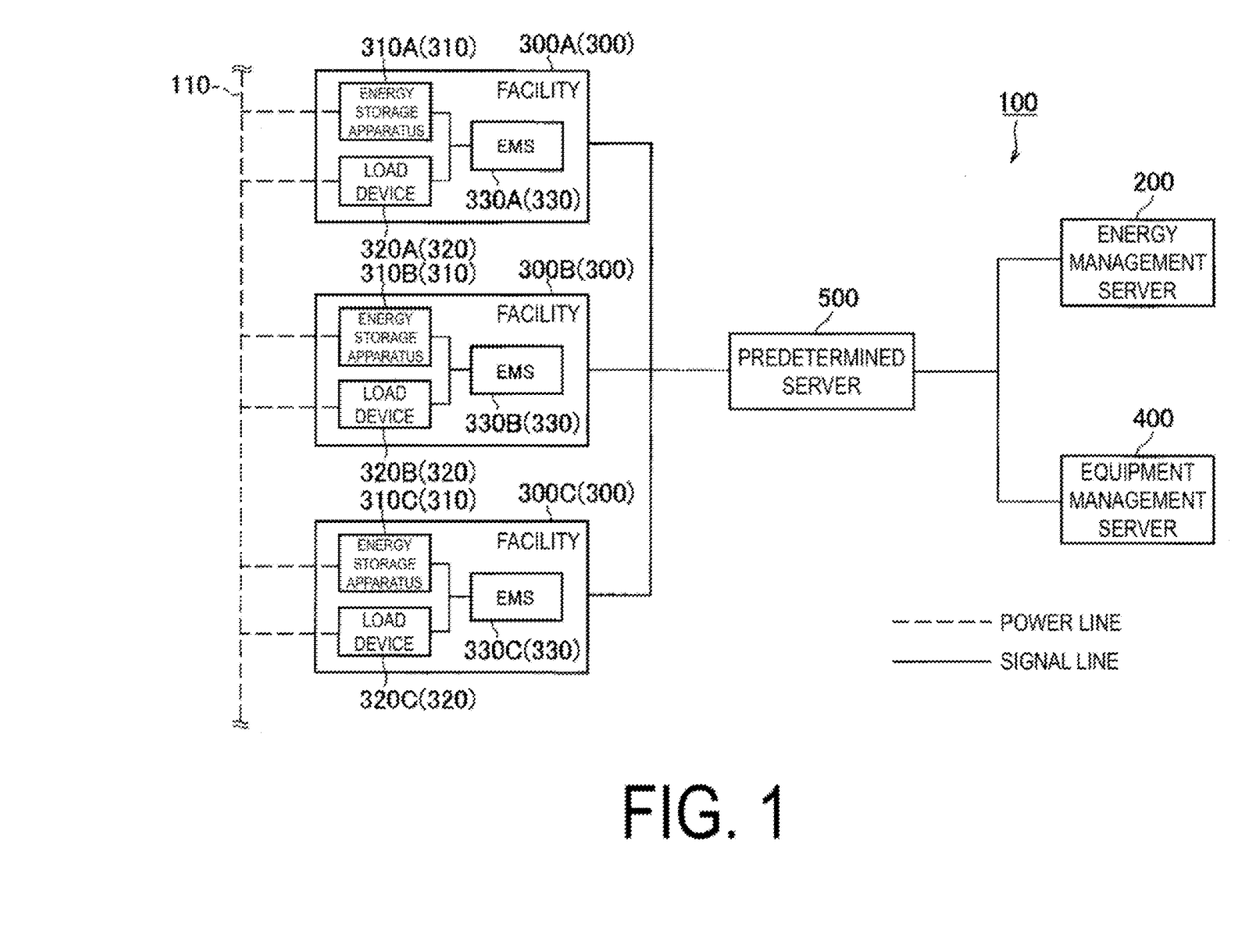
FIG. 1 is a diagram illustrating an example of an overall configuration of an energy system 100 according to an embodiment.

A first embodiment of the present invention will be described below with reference to FIGS. 1 to 6. FIG. 1 is a diagram illustrating an example of a configuration of an energy system 100 according to the present embodiment.

As illustrated in FIG. 1, the energy system 100 includes an energy management server 200, a facility 300, an equipment management server 400, and a predetermined server 500. In FIG. 1, facilities 300A to 300C are illustrated as examples of the facility 300. Here, the energy management server 200 and the equipment management server 400 may be separate servers or may be integrated.

Each facility 300 is connected to a power grid 110. One facility 300 corresponds to one consumer.

In the following description, the flow of power from the power grid 110 to the facility 300 is referred to as a power flow, and the flow of power from the facility 300 to the power grid 110 is referred to as a reverse power flow. The power grid 110 may be a transmission network that is outside consumers in a region isolated from a power company, and is used for power interchange between the consumers.

The energy management server 200 is a server that controls a distributed power supply (for example, an energy storage apparatus 310 described later). The energy management server 200 transmits, to an EMS 330 provided in the facility 300, a message as an instruction to control the energy storage apparatus 310 provided in the facility 300. For example, the energy management server 200 may transmit a power flow control message (for example, demand response (DR)) requesting control of the power flow and may transmit a reverse power flow control message requesting control of the reverse power flow. For example, the energy management server 200 is managed by a power supplier such as a power producer, a power distributor, or a retailer.

Figure 2:
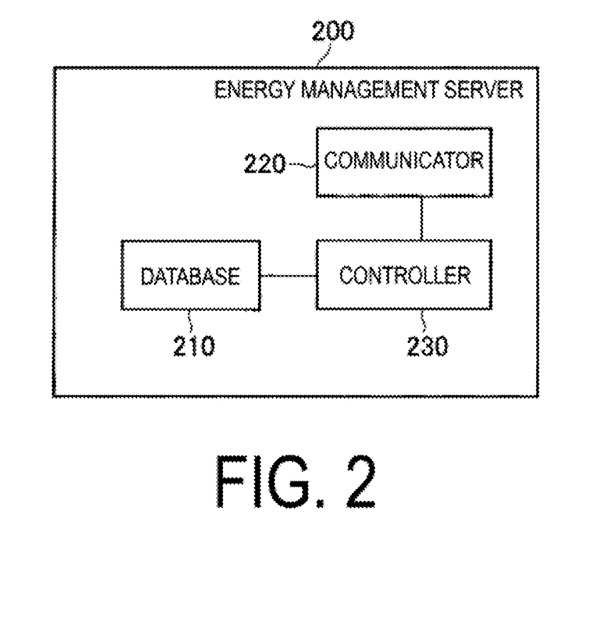
FIG. 2 is a diagram illustrating an energy management server 200 according to an embodiment.

As illustrated in FIG. 2, the energy management server 200 includes a database 210, a communicator 220, and a controller 230. The energy management server 200 is an example of a virtual top node (VTN).

The database 210 includes a storage medium, such as a non-volatile memory and/or an HDD, and stores data on the facility 300 managed by the energy management server 200. The facility 300 managed by the energy management server 200 may be a facility 300 in contract with the power operator. For example, the data on the facility 300 may be required power supplied from the power grid 110 to the facility 300. The data on the facility 300 may be the type of distributed power supply 310 provided in the facility 300, the specification of the distributed power supply 310 provided in the facility 300, and/or the like. The specification may be rated generated power (W) and maximum output power (W) of the distributed power supply 310, for example.

The communicator 220 includes a communication module, and communicates with the EMS 330 via the predetermined server 500. The communicator 220 communicates with the predetermined server 500 according to a first communication protocol. For example, as the first communication protocol, a communication protocol supporting Open Automated Demand Response (ADR) 2.0b or a unique dedicated communication protocol may be used.

The controller 230 includes a control circuit including a memory, a CPU, and the like, and controls each configuration provided in the energy management server 200.

The equipment management server 400 is a server that monitors the distributed power supply (for example, the energy storage apparatus 310 described later). The equipment management server 400 transmits a message to the EMS 330 provided in the facility 300, for performing maintenance of the distributed power supply 310 provided in the facility 300. For example, the maintenance includes: inspection to check the deterioration status of equipment, maintenance for performing minor repair during the inspection, repair for equipment failure, replacement of existing equipment with new equipment, and/or the like. Note that the maintenance may be performed while the energy storage apparatus 310 is stopped or may be performed while the energy storage apparatus 310 is operating.

Figure 3:
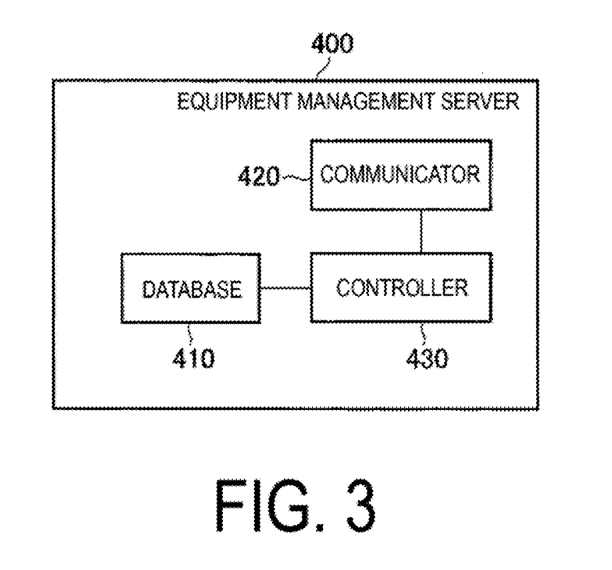
FIG. 3 is a diagram illustrating an equipment management server 400 according to an embodiment.

As illustrated in FIG. 3, the equipment management server 400 includes a database 410, a communicator 420, and a controller 430.

The database 410 includes a storage medium, such as a non-volatile memory and/or an HDD, and manages information on a plurality of the facilities 300. The database 410 may store basic information on equipment provided in each of the plurality of facilities 300. For example, the database 410 stores a facility name, facility ID, equipment name, equipment ID, introduction year, age, and service life associated with each other.

The communicator 420 includes a communication module, and communicates with the EMS 330 via the predetermined server 500. The communicator 420 communicates with the predetermined server 500 according to the first communication protocol. For example, as the first communication protocol, a communication protocol supporting Open ADR 2.0b or a unique dedicated communication protocol may be used.

The controller 430 includes a control circuit including a memory, a CPU, and the like, and controls each configuration provided in the equipment management server 400.

The predetermined server 500 is a server that relays communication between the facility 300 and the energy management server 200 and the equipment management server 400. For example, the predetermined server 500 is managed by a resource aggregator. The resource aggregator is a power supplier that provides power of a reverse power flow to a power producer, a power distributor, a retailer, and the like in a virtual power plant (VPP). The resource aggregator may be a power supplier that creates excess power (negative watts) by reducing the power consumption of the facility managed by the resource aggregator. Such excess power may be regarded as generated power. The resource aggregator may be a power supplier that absorbs excessive power by increasing the power consumption of the facility managed by the resource aggregator (for example, by increasing the charging amount of the energy storage apparatus).

As illustrated in FIG. 1, the facility 300 includes the distributed power supply (in particular, the energy storage apparatus 310), a load device 320, and the EMS 330.

The distributed power supply may be a fuel cell apparatus that generates power using fuel. The fuel cell apparatus is an apparatus that generates power using fuel. Examples of the fuel cell apparatus may include a solid oxide fuel cell (SOFC), a polymer electrolyte fuel cell (PEFC), a phosphoric acid fuel cell (PAFC), and/or a molten carbonate type fuel cell (MCFC). The distributed power supply may be a power generation device that generates power using natural energy such as sunlight, wind, water, or geothermal energy. Note that the description of the present embodiment is given assuming that the distributed power supply is the energy storage apparatus 310 that charges power and discharges power.

The energy storage apparatus 310 is a device that is controlled by the EMS 330 to perform charging and discharging. For example, the energy storage apparatus 310 is a lithium-ion energy storage apparatus, a lead energy storage apparatus, a nickel hydrogen energy storage apparatus, or the like.

Note that the power discharged by the energy storage apparatus 310 may be supplied to the load device 320 within the facility 300 or may be supplied to the power grid 110. In the present embodiment, operation may be performed under a "boost mode" in which power generated by the power generation device is sold and the power demanded by the load device 320 in the facility 300 is supplied by the power discharged from the energy storage apparatus 310. The energy storage apparatus 310 can store, for example, power supplied by the power grid 110 or the excess power of the power generation device.

The load device 320 is a device that consumes power. Examples of the load device 320 include an air conditioner, a lighting apparatus, a hot water supply device, an audio visual (AV) apparatus, an electric vehicle, a charge/discharge device, and the like.

The EMS 330 is an energy management apparatus that manages the power of the facility 300. The EMS 330 may control the operating state of the energy storage apparatus 310 and the load device 320. The EMS 330 is an example of a virtual end node (VEN).

Figure 4:
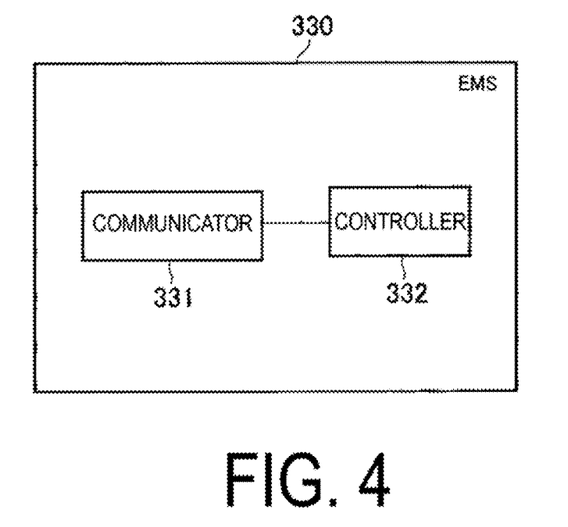
FIG. 4 is a diagram illustrating an EMS 330 according to an embodiment.

As illustrated in FIG. 4, the EMS 330 includes a communicator 331 and a controller 332.

The communicator 331 includes a communication module, and communicates with the predetermined server 500, the energy storage apparatus 310, and the load device 320. The communicator 331 communicates with the predetermined server 500 according to the first communication protocol. For example, as the first communication protocol, a communication protocol supporting Open ADR 2.0b or a unique dedicated communication protocol may be used. On the other hand, the communicator 331 communicates with the energy storage apparatus 310 and the load device 320 according to a second communication protocol. For example, as the second communication protocol, a communication protocol supporting ECHONET Lite, Smart Energy Profile (SEP) 2.0, KNX, or a unique dedicated communication protocol may be used.

The communicator 331 issues a notification, to the energy storage apparatus 310, to set a discharge power setting value for setting the power to be discharged by the energy storage apparatus 310. The communicator 331 sets whether load following discharge is to be performed (that is, whether there should be no reverse power flow) as a part of the discharge power setting value. In other words, when the communicator 331 sets the energy storage apparatus 310 to perform load following discharge, the communicator 331 notifies the energy storage apparatus 310 of a predetermined value indicating load following discharge as the discharge power setting value. The load following discharge is control with which the discharge power is increased/decreased in accordance with an increase/decrease in the power consumed by the load device 320.

For example, in a case where ECHONET Lite is used as the second communication protocol, the communicator 331 issues to the energy storage apparatus 310 a notification to set the discharge power setting value described above by using "Set" (a Set command) (see FIG. 5) of a discharge power setting value property of the storage battery class.

Figure 5:
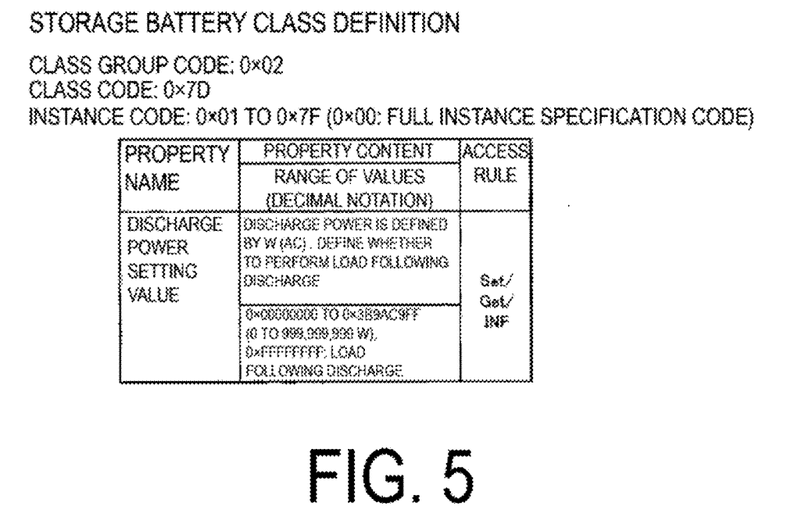
FIG. 5 is a diagram illustrating an example of a storage battery class of ECHONET Lite used in the energy system 100 according to an embodiment.

The discharge power setting value property of the storage battery class illustrated in FIG. 5 includes content newly defining whether "load following discharge is performed (whether there should be no reverse power flow)" and includes a range of values newly defining "0xFFFFFFFF: load following discharge (no reverse power flow)", in addition to that of the existing discharge power setting value property. Note that the value indicating this "load following discharge (no reverse power flow)" may not be "0xFFFFFFFF", and may be, for example, the maximum value in the range of values, a value larger than the rated output, and the like.

The discharge power setting value property of the storage battery class illustrated in FIG. 5 is newly defined such that it can be used not only as "Get" for acquiring information from the energy storage apparatus 310, but also as "INF" for notifying the state of the energy storage apparatus 310, and "Set" for performing setting for the energy storage apparatus 310.

The controller 332 controls the operating state of the distributed power supply, such as the energy storage apparatus 310, and the load device 320 within the facility 300.

Figure 6:
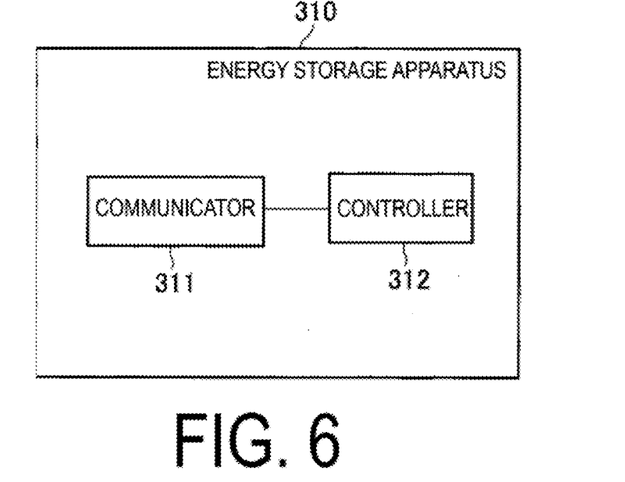
FIG. 6 is a diagram illustrating an energy storage apparatus 310 according to an embodiment.

As illustrated in FIG. 6, the energy storage apparatus 310 includes a communicator 311 and a controller 312.

The communicator 311 includes a communication module, and communicates with the EMS 330. As described above, the communicator 311 performs communications according to the second communication protocol.

The communicator 311 receives the notification of the discharge power setting value for setting the power discharged by the energy storage apparatus 310, from the EMS 330. For example, in a case where ECHONET Lite is used as the second communication protocol, the communicator 311 acquires the discharge power setting value described above, from "Set" (see FIG. 5) in the discharge power setting value property of the storage battery class transmitted from the EMS 330.

The controller 312 controls the operating state (such as power storage and discharge) of the energy storage apparatus 310 in accordance with an instruction from the EMS 330.

The controller 312 sets whether the energy storage apparatus 310 performs load following discharge, based on a value defined as a part of the discharge power setting value acquired by the communicator 311. In other words, the controller 312 sets load following discharge when the discharge power setting value acquired by the communicator 311 is a predetermined value indicating load following discharge.

For example, ECHONET Lite may be used as the second communication protocol. In this case, the controller 312 sets whether the energy storage apparatus 310 performs load following discharge based on a value defined in "0xFFFFFFFF" in the range of values of the discharge power setting value property of the storage battery class. Specifically, the controller 312 sets the energy storage apparatus 310 to perform load following discharge when no value is set in "0xFFFFFFFF" in the range of values of the discharge power setting value property of the storage battery class. On the other hand, the controller 312 sets the energy storage apparatus 310 not to perform load following discharge when a value is set in "0xFFFFFFFF" in the range of values of the discharge power setting value property of the storage battery class.

Note that the present disclosure is not limited to the case where the EMS 330 is provided in the facility 300 as described in the present embodiment, and is also applicable to a case where the EMS 330 is provided in the predetermined server 500. In such a case, communication is performed between the predetermined server 500 and the energy storage apparatus 310, for example, according to ECHONET Lite.

According to the present embodiment, the power stored in the energy storage apparatus 310 can be set to be discharged to the power grid 110 side based on a communication protocol between the EMS 330 and the energy storage apparatus 310, with minimum modification to an existing communication protocol.

Second Embodiment

A second embodiment of the present invention will be described below with reference to FIG. 7, while focusing on differences from the first embodiment described above.

The communicator 331 of the EMS 330 issues a notification, to the energy storage apparatus 310, to set an operation mode setting for setting the operation mode of the energy storage apparatus 310. Here, in such an operation mode setting, the communicator 331 sets discharge with a reverse power flow from the energy storage apparatus 310 to the power grid 110 and discharge without the reverse power flow from the energy storage apparatus 310 to the power grid 110 as operation modes that are distinguished from each other.

Figure 7:
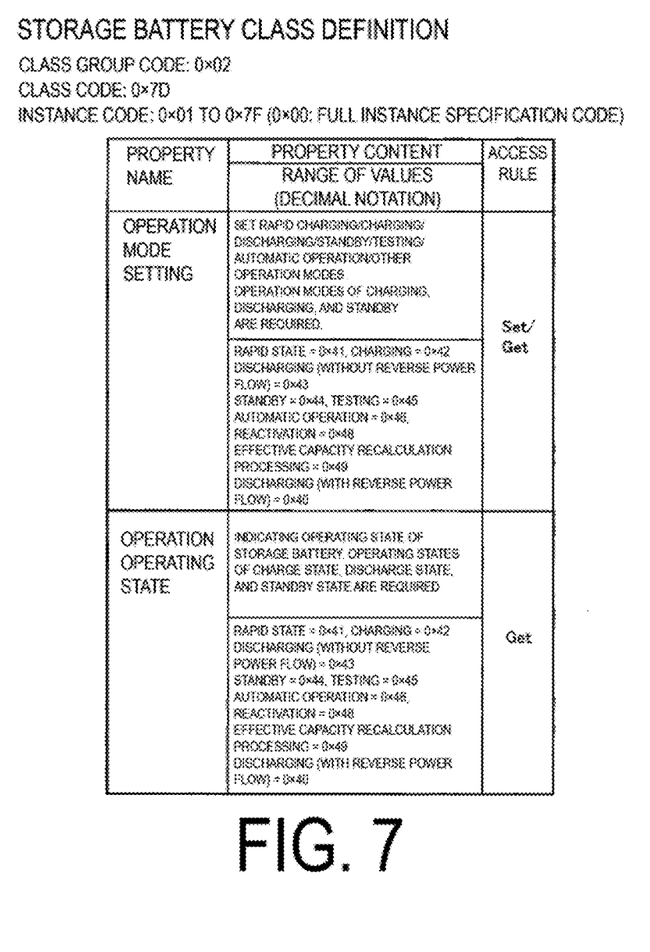
FIG. 7 is a diagram illustrating an example of a storage battery class of ECHONET Lite used in the energy system 100 according to an embodiment.

For example, in a case where ECHONET Lite is used as the second communication protocol, the communicator 331 issues a notification to set the above operation modes to the energy storage apparatus 310 by using "Set" of the operation mode setting property of the storage battery class (see FIG. 7).

Here, the operation mode setting property of the storage battery class illustrated in FIG. 7 indicates, as such an operation mode, any one of rapid charging, charging, discharging (no reverse power flow), standby, testing, automatic operation, reactivation, effective capacity recalculation processing, and discharging (with a reverse power flow).

In other words, the operation mode setting property of the storage battery class illustrated in FIG. 7 newly defines discharging (no reverse power flow) and discharging (with a reverse power flow) for the operation mode setting property of the existing storage battery class.

Specifically, in the operation mode setting property of the storage battery class, "discharging" in the operation mode setting property of the existing storage battery class may be regarded as "discharging (no reverse power flow)", and "discharging (with a reverse power flow)" may be newly added, or both "discharging (with a reverse power flow)" and "discharging (no reverse power flow)" may be newly added.

Similarly, an operation operating state property of the storage battery class illustrated in FIG. 7 indicates, as such an operation operating state, any one of rapid charging, charging, discharging (no reverse power flow), standby, testing, automatic operation, reactivation, effective capacity recalculation processing, and discharging (with a reverse power flow).

In other words, the operation operating state property of the storage battery class illustrated in FIG. 7 newly defines discharging (no reverse power flow) and discharging (with a reverse power flow) for the operation operating state property of the existing storage battery class.

The communicator 311 of the energy storage apparatus 310 receives a notification of the operation mode setting for setting the operation mode from the EMS 330. For example, in a case where ECHONET Lite is used as the second communication protocol, the communicator 311 acquires the operation mode setting described above, from "Set" (see FIG. 7) in the operation mode setting property of the storage battery class transmitted from the EMS 330.

For example, in a case where ECHONET Lite is used as the second communication protocol, the communicator 311 notifies the EMS 330 of the operation operating state of the energy storage apparatus 310 based on "Get" (see FIG. 7) of the operational operating state property transmitted by the EMS 330.

The controller 312 of the energy storage apparatus 310 sets the operation mode of the energy storage apparatus 310 in accordance with the operation mode setting acquired by the communicator 311.

For example, ECHONET Lite may be used as the second communication protocol. In this case, in a case where "0x43" is set in the range of values of the operation mode setting of the storage battery class, the controller 312 sets discharging without the reverse power flow as the operation mode. On the other hand, in a case where "0x40" is set in the range of values of the operation mode setting of the storage battery class, the controller 312 sets discharging with a reverse power flow as the operation mode. Note that compatibility with the existing ECHONET Lite can be maintained by such setting.

According to the present embodiment, the power stored in the energy storage apparatus 310 can be set to be discharged to the power grid 110 side based on a communication protocol between the EMS 330 and the energy storage apparatus 310, with minimum modification to an existing communication protocol.

Third Embodiment

A third embodiment of the present invention will be described below with reference to FIG. 8, while focusing on differences from the first embodiment and the second embodiment described above.

The communicator 331 of the EMS 330 issues a notification, to the energy storage apparatus 310, to set a grid connection state for setting a connection state with the power grid 110 and an operation mode setting for setting the operation mode.

Here, the communicator 331 sets a grid connection with a reverse power flow and a grid connection without the reverse power flow in the above grid connection state as distinguished from each other, and sets discharging in the above operation mode setting.

For example, in a case where ECHONET Lite is used as the second communication protocol, the communicator 331 issues to the energy storage apparatus 310 a notification to set the grid connection state described above by using "Set" (a Set command) (see FIG. 8) of a grid connection state property of the storage battery class. Furthermore, the communicator 331 issues a notification to set the above operation mode to the energy storage apparatus 310 by using "Set" (see FIG. 8) of the operation mode setting property of the storage battery class.

Figure 8:
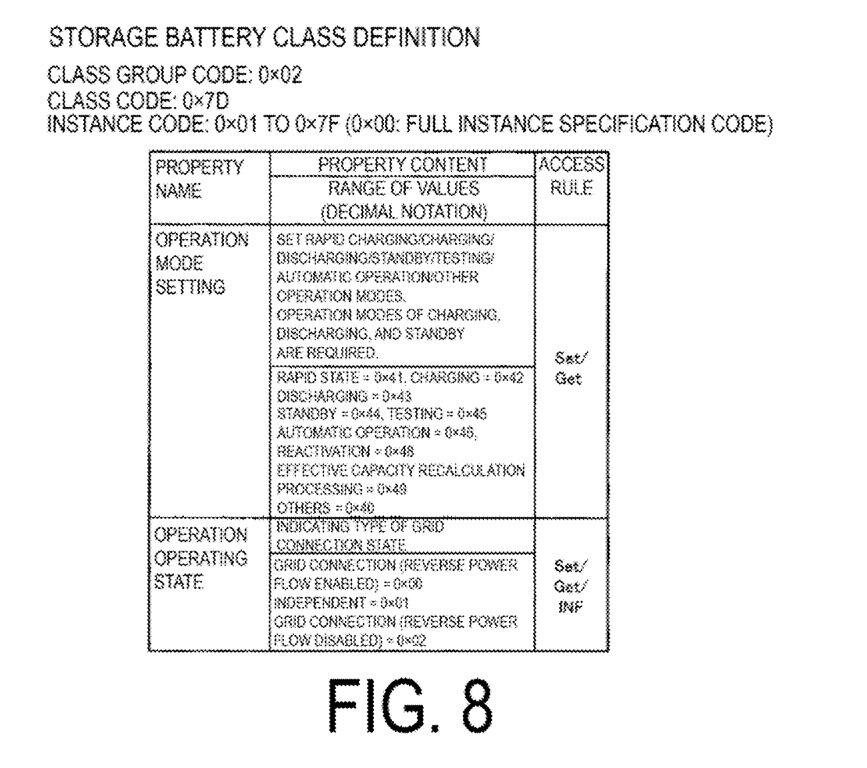
FIG. 8 is a diagram illustrating an example of a storage battery class of ECHONET Lite used in the energy system 100 according to an embodiment.

Here, the operation mode setting property of the storage battery class illustrated in FIG. 8 indicates, like the existing operation mode setting property, as such an operation mode, any one of rapid charging, charging, discharging, standby, testing, automatic operation, reactivation, effective capacity recalculation processing, and others. In other words, the operation mode setting property of the storage battery class illustrated in FIG. 8 is the same as the existing operation mode setting property of the storage battery class.

The grid connection state property of the storage battery class illustrated in FIG. 8 is newly defined such that it can be used not only as "Get" for acquiring information from the energy storage apparatus 310, but also as "INF" for notifying the state of the energy storage apparatus 310 and/or "Set" for performing setting for the energy storage apparatus 310.

Note that the communicator 331 may issue a notification, to the energy storage apparatus 310, to set the above grid connection state and then a notification to set the above operation mode setting, or may simultaneously issue a notification to set the above grid connection state and operation mode setting.

For example, in a case where ECHONET Lite is used as the second communication protocol, the communicator 331 issues to the energy storage apparatus 310 a notification to set the grid connection state described above by using "Set" (see FIG. 8) of the grid connection state property of the storage battery class. Furthermore, the communicator 331 issues a notification to set the above operation mode to the energy storage apparatus 310 by using "Set" (see FIG. 8) of the operation mode setting property of the storage battery class.

For example, in a case where ECHONET Lite is used as the second communication protocol, the communicator 331 may simultaneously transmit "Set" of the grid connection state property of the storage battery class and "Set" of the operation mode setting property of the storage battery class.

Alternatively, in a case where ECHONET Lite is used as the second communication protocol, the communicator 331 may transmit "Set" of the grid connection state property of the storage battery class and then transmit "Set" of the operation mode setting property of the storage battery class.

The communicator 311 of the energy storage apparatus 310 receives a notification of the grid connection state and the operation mode setting described above from the EMS 330. For example, in a case where ECHONET Lite is used as the second communication protocol, the communicator 311 acquires the grid connection state described above from "Set" (see FIG. 8) in the grid connection state property transmitted from the EMS 330. In addition, the communicator 311 acquires the operation mode setting described above from "Set" (see FIG. 8) of the operation mode setting property of the storage battery class transmitted from the EMS 330.

Here, the communicator 311 may receive the notification of the operation mode setting described above after receiving the notification of the grid connection state described above, or may simultaneously receive the notification of the grid connection state and the notification of the operation mode setting described above.

The controller 312 of the energy storage apparatus 310 sets the connection state of the energy storage apparatus 310 with the power grid 110 in accordance with the grid connection state acquired by the communicator 311. The controller 312 also sets the operation mode of the energy storage apparatus 310 in accordance with the operation mode setting acquired by the communicator 311.

For example, ECHONET Lite may be used as the second communication protocol. In this case, in a case where "0x00" is set in the range of values of the grid connection state property of the storage battery class and "0x43" is set in the range of values of the operation mode setting of the storage battery class, the controller 312 sets discharging with a reverse power flow as the operation mode. On the other hand, in a case where "0x02" is set in the range of values of the grid connection state property of the storage battery class and "0x43" is set in the range of values of the operation mode setting of the storage battery class, the controller 312 sets discharging without the reverse power flow as the operation mode.

According to the present embodiment, the power stored in the energy storage apparatus 310 can be set to be discharged to the power grid 110 side based on a communication protocol between the EMS 330 and the energy storage apparatus 310, with minimum modification to an existing communication protocol.

Fourth Embodiment

Figure 9:
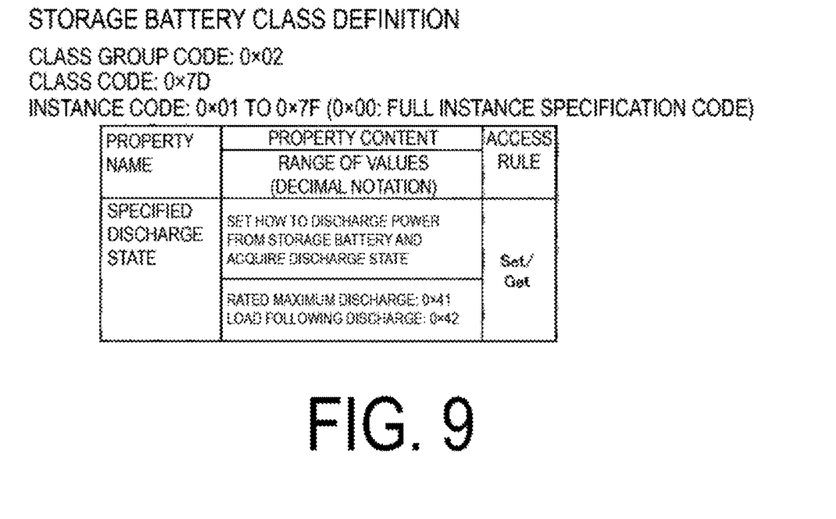
FIG. 9 is a diagram illustrating an example of a storage battery class of ECHONET Lite used in the energy system 100 according to an embodiment.

A fourth embodiment of the present invention will be described below with reference to FIG. 9, while focusing on differences from the first embodiment to the third embodiment described above.

The communicator 331 of the EMS 330 issues, to the energy storage apparatus 310, a notification to set a specified discharge state for setting whether rated maximum discharge is performed, specified output discharge is performed, or load following discharge is performed. In other words, the communicator 331 of the EMS 330 issues a notification, to the energy storage apparatus 310, to set the specified discharge state for setting one of performing rated maximum discharge, performing specified output discharge, and performing load following discharge. Here, the specified power is set to "Set" of the discharge power setting value property of the storage battery class.

For example, in a case where ECHONET Lite is used as the second communication protocol, the communicator 331 issues to the energy storage apparatus 310 a notification to set the specified discharge state described above by using "Set" (see FIG. 9) of the specified discharge state property of the storage battery class. Note that the specified discharge state property of the storage battery class is a property not defined by the existing ECHONET Lite. The content of the specified discharge state property of the storage battery class illustrated in FIG. 9 includes setting how to discharge power from the energy storage apparatus 310 and acquiring a set state.

The communicator 311 of the energy storage apparatus 310 receives a notification of the specified discharge state described above from the EMS 330. For example, in a case where ECHONET Lite is used as the second communication protocol, the communicator 311 acquires the specified discharge state described above from the specified discharge state property of the storage battery class (see FIG. 9).

The controller 312 of the energy storage apparatus 310 sets whether rated maximum discharge is performed, specified output discharge is performed or load following discharge is performed, in accordance with the specified discharge state acquired by the communicator 311. In other words, the controller 312 of the energy storage apparatus 310 sets performing rated maximum discharge, performing specified output discharge, or performing load following discharge, in accordance with the specified discharge state acquired by the communicator 311.

For example, ECHONET Lite may be used as the second communication protocol. In this case, in a case where "0x41" is set in the range of values of the specified discharge state of the storage battery class, the controller 312 sets performing rated maximum (or specified output) discharge. On the other hand, in a case where "0x42" is set in the range of values of the specified discharge state of the storage battery class, the controller 312 sets performing load following discharge.

According to the present embodiment, the power stored in the energy storage apparatus 310 can be set to be discharged to the power grid 110 side based on a communication protocol between the EMS 330 and the energy storage apparatus 310, while utilizing an existing communication protocol.

Modifications

In the second embodiment and the third embodiment described above, the communicator 331 of the EMS 330 may notify the energy storage apparatus 310 of a power purchase target value for preventing a reverse power flow.

Here, the communicator 331 may issue a notification, as the power purchase target value, of a margin between the load power and the discharge amount in a case where the discharging without the reverse power flow is set to be performed. For example, the communicator 331 may issue a notification, as the power purchase target value, of a ratio such as 0% or 5% or a power value such as 0 W or 100 W.

When the controller 312 of the energy storage apparatus 310 is set to perform discharging without the reverse power flow, the controller 312 controls discharging in the energy storage apparatus 310 based on the margin notified as the above power purchase target value.

OTHER EMBODIMENTS

Although the present disclosure has been described with reference to the above embodiments, it should be understood that the discussion and drawings that form a part of this disclosure do not limit the present invention. Various alternative embodiments, examples, and operational techniques will be apparent to those skilled in the art from the present disclosure.

In the above embodiments, a case in which the energy management server 200, the equipment management server 400, and the predetermined server 500 manage a plurality of the facilities 300 is illustrated. However, the energy management server 200, the equipment management server 400, and the predetermined server 500 may manage one facility 300. In such a case, the energy management server 200, the equipment management server 400, and the predetermined server 500 may be included in the EMS 330.

In the above embodiments, some of the functions of the EMS 330 may be provided by a cloud server provided on the Internet. That is, the EMS 330 may be considered to include a cloud server.

In the above embodiments, a case in which the first communication protocol is a protocol supporting OpenADR 2.0b or a unique dedicated communication protocol, and the second communication protocol is a protocol supporting ECHONET Lite, SEP2.0, KNX, or a unique dedicated communication protocol is described. However, the embodiments are not limited to this case. The first communication protocol may be a protocol standardized as a protocol used for communication between the energy management server 200 and the EMS 330. The second communication protocol may be a protocol standardized as a protocol used in the facility 300.

The present application claims priority to Japanese Patent Application No. 2019-013678, filed on Jan. 29, 2019, the contents of which are incorporated herein by reference in their entirety.

The invention claimed is:

1. An energy management apparatus that manages an energy storage apparatus, the energy management apparatus comprising:
a communicator configured to transmit a first message for acquiring a discharge scheme in a case where discharge is set in an operating mode setting property, to the energy storage apparatus, wherein
the communicator is configured to receive, from the energy storage apparatus, as a response to the first message, a second message,
the first message includes, as the discharge scheme in the case where the discharge is set in the operating mode setting property,
the operating mode setting property where the discharge is set, and
a specified discharge scheme property including a predetermined value indicating at least one discharge of a load following, a maximum discharge power value, and a specified discharge power,
the first message is a Get message of acquiring the discharge scheme from the energy storage apparatus, and
the second message is a Get Res message as a response to the Get message.

2. The energy management apparatus according to claim 1, wherein
the specified discharge scheme property is a property for acquiring the discharge scheme in a case where the discharge is performed in the energy storage apparatus.

3. An energy storage apparatus controlled by an energy management apparatus, the energy storage apparatus comprising:
a communicator configured to receive, from the energy management apparatus, a first message for acquiring a discharge scheme in a case where discharge is set in an operating mode setting property, wherein
the communicator is configured to transmit, to the energy management apparatus, as a response to the first message, a second message,
the first message includes, as the discharge scheme in the case where the discharge is set in the operating mode setting property,
the operating mode setting property where the discharge is set, and
a specified discharge scheme property including a predetermined value indicating at least one discharge of a load following, a maximum discharge power value, and a specified discharge power,
the first message is a Get message of acquiring the discharge scheme from the energy storage apparatus, and
the second message is a Get Res message as a response to the Get message.

4. The energy storage apparatus according to claim 3, wherein
the specified discharge scheme property is a property for acquiring the discharge scheme in a case where the discharge is performed in the energy storage apparatus.

5. An energy management method in an energy storage apparatus controlled by an energy management apparatus, the energy management method comprising:
receiving, from the energy management apparatus, a first message for acquiring a discharge scheme in a case where discharge is set in an operating mode setting property; and
transmitting, to the energy management apparatus, as a response to the first message, a second message, wherein
the first message includes, as the discharge scheme in the case where the discharge is set in the operating mode setting property,
the operating mode setting property where the discharge is set, and
a specified discharge scheme property including a predetermined value indicating at least one discharge of a load following, a maximum discharge power value, and a specified discharge power,
the first message is a Get message of acquiring the discharge scheme from the energy storage apparatus, and
the second message is a Get Res message as a response to the Get message.

6. The energy management method according to claim 5, wherein
the specified discharge scheme property is a property for acquiring the discharge scheme in a case where the discharge is performed in the energy storage apparatus.

* * * * *